(12) United States Patent
Nishidate

(10) Patent No.: US 8,677,382 B2
(45) Date of Patent: Mar. 18, 2014

(54) DISC CLAMPING MECHANISM BY WHICH A DISC IS HELD AND ROTATED

(75) Inventor: Masahiro Nishidate, Isesaki (JP)

(73) Assignee: Tokyo Parts Industrial Co., Ltd., Gunma-ken (JP)

( * ) Notice: Subject to any disclaimer, the term of this patent is extended or adjusted under 35 U.S.C. 154(b) by 0 days.

(21) Appl. No.: 13/617,746

(22) Filed: Sep. 14, 2012

(65) Prior Publication Data

US 2013/0254785 A1    Sep. 26, 2013

(30) Foreign Application Priority Data

Dec. 2, 2011   (JP) .................................. 2011-264255

(51) Int. Cl.
   *G11B 17/028* (2006.01)
(52) U.S. Cl.
   USPC .......................................... 720/710; 720/712
(58) Field of Classification Search
   USPC .................. 720/600, 601, 695–717
   See application file for complete search history.

(56) References Cited

U.S. PATENT DOCUMENTS

2005/0028182 A1* 2/2005 Tokumitsu .................... 720/717
2008/0189731 A1* 8/2008 Loh .............................. 720/710

FOREIGN PATENT DOCUMENTS

JP     2000-156007      6/2000
JP     2011170913 A  *  9/2011

OTHER PUBLICATIONS

English translation of JP 2011170913 A.*

* cited by examiner

*Primary Examiner* — Nathan Danielsen
(74) *Attorney, Agent, or Firm* — Jordan and Hamburg LLP

(57) ABSTRACT

A cylindrical member is fixed to an upper portion of a rotary shaft and a clamper presses an optical disc in contact with the top of a turntable. The structure is such that a first bottom face of the cylindrical member that faces a clamping magnet in the axial direction is positioned below an opposite face of the clamper that faces the clamping magnet in the axial direction.

9 Claims, 16 Drawing Sheets

DISC CLAMPING MECHANISM BY WHICH A DISC IS HELD AND ROTATED

BACKGROUND OF THE INVENTION

The present invention relates to a disc clamping mechanism whereby an optical disc or a magneto-optical disc or the like is held and rotated.

Disc drive devices equipped with head mechanisms for reading information recorded on a disc or writing information to a disc are known in the form of devices for optical discs such as CDs, DVDs and MDs, and for magneto-optical discs.

With disc drive devices, a turntable of a spindle motor, by which a disk is rotationally driven, must be in pressing contact with and hold the disc. Thus, in disc drive devices, a clamper is provided that is in direct contact with the top face of a disc that is placed on the turntable, and a clamping magnet is provided in the center of the turntable of the spindle motor so as to attract the clamper.

For example, in Japanese Patent Laid-Open Publication No. 2000-156007, a device such as shown in FIG. 15 and FIG. 16 is disclosed. FIG. 15 shows the state before the clamper is attached to the turntable, and FIG. 16 shows the state of the clamper being attached to the turntable.

As shown in the drawing, a spindle motor 131 comprises a motor body 132 and a rotary shaft 133, and a turntable 134, on which an optical disc 150 is placed, is mounted in the rotary shaft 133. A placing face 135, on which the optical disc 150 is placed, is formed on the outer circumference of the turntable 134. In the inner circumference of the placing face 135, a disc guide 137, which protrudes toward upwards from the placing face 135, is formed. When the optical disc 150 is placed on the placing face 135, the disc guide 137 is fit in a central hole 151 of the optical disc 150, in order to position the optical disc.

In the inner circumference of the disc guide 137, a recess 138 is formed. In the recess 138, a clamping magnet 139, which attaches a clamper 145, and a yoke 140 for controlling the magnetic resistance of the clamping magnet 139, are disposed. Furthermore, the inner circumference of the disc guide 137 has an insertion hole 141, which is positioned at the approximate center of the turntable 134, and through which the rotary shaft 133 of the spindle motor 131 passes. The rotary shaft 133 of the spindle motor is attached to the insertion hole 141, and the turntable 134 turns together with the rotary shaft 133.

The clamper 145, which holds the turntable 134 together with the optical disc 150, at the approximate center thereof, has a through-hole 146, through which passes a locking protrusion 129, which is provided in a cover 128 that constitutes a portion of a case for an optical disc device.

A locking piece 147 is locked by way of the locking protrusion 129 that is provided in the cover 128 being inserted in the through-hole 146, and by way of a stopper 130 that is mounted on the tip of the locking protrusion 129, thus allowing the clamper 145 to be mounted so as to be mobile with respect to the upper cover 128. On the outer circumference of the locking piece 147, a positioning protrusion 148 is provided for positioning the clamper 145 in relation to the turntable 134. The clamper 145 is positioned in relation to the turntable 134 by way of the positioning protrusion 148 being fit along the circumference of the recess 138, which is provided in the turntable 134. In addition, in the outer circumference of the clamper 145, corresponding to the placing face 135 of the turntable 134, a disc pressing portion 149 is formed that is in direct contact with the optical disc 150 and clamps the optical disc 150 together with the placing face 135.

As shown above, eccentricity during rotation of the optical disc 150 is controlled by way of accurately positioning on the turntable 134 of the clamper 145, so that suitable recording and playback of the optical disc can be performed.

Furthermore, when the clamper 145 is attached to the turntable 134, because the configuration is such that the optical disc 150 is clamped in between the disc pressing portion 149 of the clamper 145 and the placing face 135 of the turntable 134, the optical disc 150 can be held securely by the turntable 134 and clamper 145.

However, although the clamping magnet 139 and yoke 140 are fixed in the recess 138 with adhesive or the like, if, for example, the adhesive strength decreases due to degradation of the adhesive or the like, there is a risk of the clamping magnet 139 coming off and detaching from the turntable due to shocks resulting from the effect of magnetic attraction when a disc is mounted or removed, vibrations due to fast rotation of the spindle motor, or the like. If the clamping magnet 139 is detached from the turntable, with the conventional device above, the clamping magnet 139 attaches to the clamper 145, the optical disc 150 cannot be held by the turntable 134 and clamper 145, and stable disc driving cannot be achieved.

SUMMARY OF THE INVENTION

One or more of the embodiments of the present invention solves the aforementioned problems of the prior art and provides a disc clamping mechanism that can clamp a disc in state in which it is in contact with a turntable top, even when the clamping magnet is detached from the turntable, and thus can perform stable disc driving.

According to one or more embodiments of the present invention, the disc clamping mechanism:

is provided with a spindle motor M1 (M2), having a turntable hat rotates united with a rotary shaft 22, on which a disc 40 is placed, and a clamper 30A, which is positioned in the upper part of the spindle motor M1 (M2), comprising:

a disc guide 23 (53) that guides the inner edge of the disc;

a clamping magnet 27, which is disposed in the inner diameter of the disc guide 23 (53), and a cylindrical member 28 (58), which is fixed to the upper portion of the rotary shaft 22, wherein the cylindrical member 28 (58) has a first bottom face 28c (58c) that faces the clamping magnet 27 in the axial direction with a gap H1 therebetween; and the first bottom face 28c (58c), in a state in which the clamper 30A presses the disc 40 in contact with the top of the turntable, is positioned below a facing part 33 of the clamper 30A, which faces the clamping magnet 27 in the axial direction, In the aforementioned structure, the disc guide 23 may have an annular recess 23b, and the clamping magnet 27 may be disposed in the recess 23b; the cylindrical member 28 may have a second bottom face 28d in the inner diameter of the first bottom face 28c; and the second bottom face 28d may face the disc guide 23 in the axial direction with a gap H2 therebetween. In this case, it is preferable that: the gap H1 is larger than the gap H2; and in a state in which the clamper 30A presses the disc 40 in contact with the turntable top, with a gap H3 being the minimum gap in the axial direction between the disc guide 23 and the clamper 30A, the gap H3 is larger than the gap H2. Furthermore, it is preferable that gap H1 is no greater than the gap H2; and in a state in which the clamper 30A presses the disc 40 in contact with the turntable top, with a gap H3 being the minimum gap in the axial direction between the disc guide 23 and the clamper 30A, the gap H3 is larger than the gap H1.

Furthermore, in the aforementioned structure, the disc guide 23 may have an annular recess 23b, and the clamping magnet 27 may be disposed in the recess 23b; the cylindrical member 28 may have a second bottom face 28d in the inner diameter of the first bottom face 28c; and the second bottom face 28d may be in direct contact with the disc guide 23.

Furthermore, in the aforementioned structure, the disc guide 53 may have a through-opening, and the clamping magnet 27 may be disposed in the through-hole and abut against the turntable.

Furthermore, in the aforementioned structure, the clamper may have a positioning hole or a positioning recess, and the cylindrical member may have an outer circumference that is fitted in the positioning hole or positioning recess of the clamper. In this case, it is preferable that the cylindrical member has an inclined face on the upper portion of the outer circumference, and the outer diameter gradually decreases in the upward direction.

Furthermore, with the aforementioned structure, the cylindrical member is preferably made from a non-magnetic material.

According to one or more embodiments of the present invention, even if a clamping magnet were to detach and rise from the turntable, the clamping magnet would be stopped by abutting against the first bottom face of the cylindrical member, and thus not attaching to the clamper. Thus, even if the clamper magnet detaches from the turntable, the disc can be clamped in a state in which it is in pressing contact with the turntable, and stable disc drive can be achieved.

DESCRIPTION OF THE PREFERRED EMBODIMENTS

Hereinafter embodiments of the present invention are described by way of example based on the drawings.

First Embodiment

Figure 1:
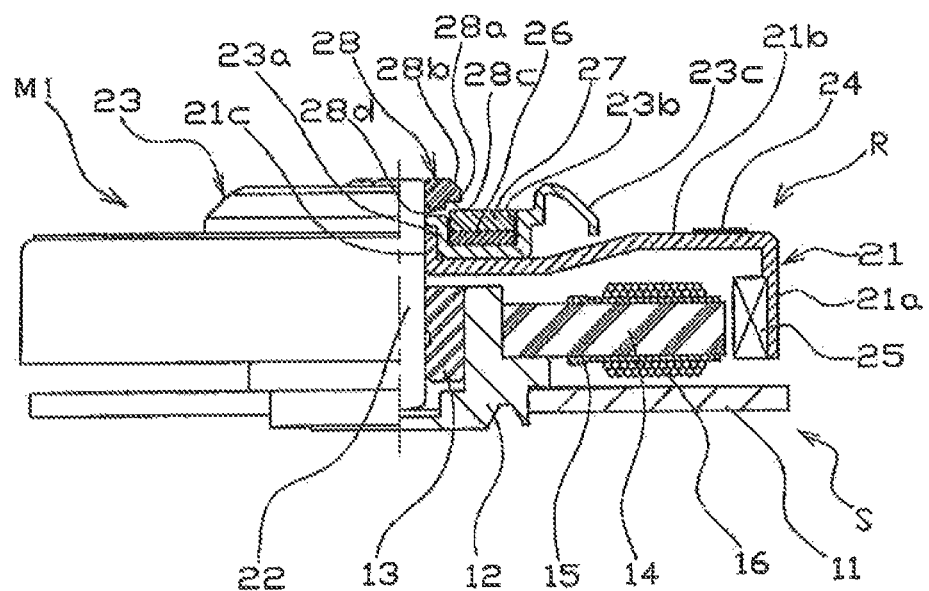
FIG. 1 is a side view of a spindle motor M1 according to a first embodiment of the present invention, and the right half of the drawing is shown as a cross-section.

First, the configuration of a spindle motor according to a first embodiment of the present invention is described by way of FIG. 1. FIG. 1 is a side view of a spindle motor M1 of this example, and the right half of the drawing is shown as a cross-section. The spindle motor M1 primarily comprises a stator S and a rotor R.

The stator S has a bearing unit comprising a bearing holder 12 and a bearing 13, a stator core 14 that is disposed around the bearing unit, a core cover 15, and a coil 16.

The bearing holder 12 is fixed to a base 11, wherein a steel plate is layered and mounted on a so-called iron substrate, on the surface of which a printed circuit is formed, or a printed wiring board is overlaid. The sintering metal of the cylinder is impregnated with a lubricating oil, and the bearing 13 is fixed to the inner circumference of the bearing holder 12 by way of press-fitting or the like. Note that on the base 11, a Hall element (not shown) is provided facing a driving magnet 25, which is described below, so that the rotation of the rotor R can be detected by way of the Hall element.

The stator core 14 comprises a planar core laminate, on which a plurality of salient poles are formed, and is fixed to the outer circumference of the bearing holder 12. On the surface of the stator core 14, the core cover 15, which is made from an insulating resin, is disposed; the coil 16 is wound on with the core cover 15 therebetween.

The rotor R has a rotary shaft 22, which is rotatably supported in the bearing unit; a rotor case 21, that rotates united with the rotary shaft 22; and the driving magnet 25, which is fixed to the rotor case 21.

The rotor case 21 is formed into a cap shape with a magnetic plate, and has a cylinder part 21a, which is formed into a cylinder coaxial with the rotary shaft 22, and a upper face 21b, wherein the inner diameter has slightly lower profile. The rotary shaft 22 is fixed to a burring 21c, which is provided in the center of the upper face 21b of the rotor case 21, by way of press-fitting, and is supported in a rotatable state by the bearing 13.

The annular driving magnet 25, which faces the salient poles of the stator core 14 in the radial direction, is mounted in the interior of the cylinder part 21a of the rotor case 21. The driving magnets 25 are N/S alternatingly multipole-magnetized in the circumferential direction. The upper face 21b of the rotor case 21 serves as the turntable, which rotates united with the rotary shaft 22, and on which a disc is removably disposed. Moreover, a disc guide 23 is disposed in the inner diameter of the upper face 21b, and a friction sheet 24 is disposed in the outer diameter of the upper face 21b.

The disc guide 23 is a part for guiding a disc concentric with the rotary shaft 22, and is fixed in place by an inside upright portion 23a being press-fit against the outer circumference of the barring part 21c of the rotor case 21. The disc guide 23 is formed from a hard resin and has a recess 23b at the outer circumference of the upright portion 23a, a plurality of guide claws 23c being provided in the outer circumference of the recess 23b at equal intervals in the rotational direction. The claws 23c are in direct contact with the inner edge of the central hole in the disc.

A yoke plate 26 and a clamping magnet 27 are disposed in the recess 23b of the disc guide 23. The yoke plate 26 and the clamping magnet 27 are both formed into an annular shape. The yoke plate 26 serves as a back yoke for the clamping magnet 27 and is formed from a magnetic body. The clamping magnet 27 magnetically attracts a clamper, which is described below, and attracts the clamper toward the turntable (toward the upper face 21b).

Figure 2:
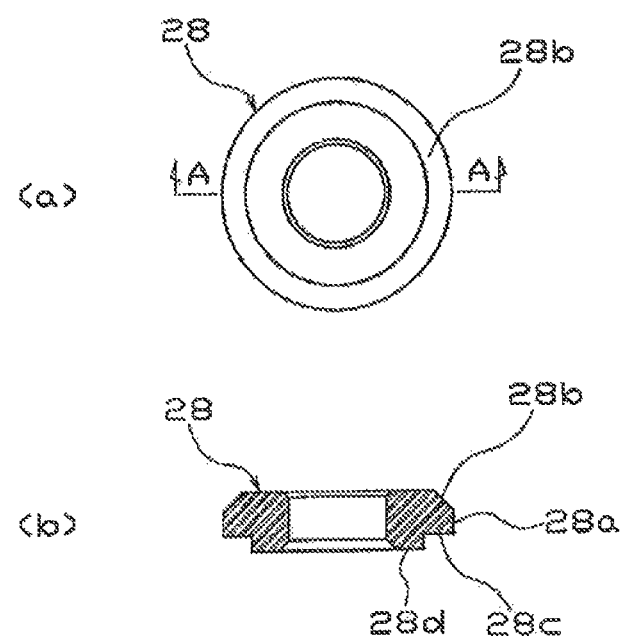
FIG. 2 shows a cylindrical member in the spindle motor M1 of FIG. 1; (a) is a top view, and (b) is a sectional view cut along the line A-A in (a).

A cylindrical member 28 is press-fit into the upper portion of the rotary shaft 22. As shown in FIG. 2, the upper part of the outer circumference 28a of the cylindrical member 28 of this example is an inclined face 28b, and the outer diameter gradually decreases in the upward direction. Details are described below, but the outer circumference 28a, which includes the inclined face 28b, centers the clamper. Furthermore, the bottom face of the cylindrical member 28 of this example is step-shaped, and has a first bottom face 28c on outer diameter and a second bottom face 28d on the inner diameter, which is lower than the first bottom face 28c.

As shown in FIG. 1, the structure is such that the outer diameter of the outer circumference 28a of the cylindrical member 28 is larger than the inner diameter of the clamping magnet 27, and the first bottom face 28c of the cylindrical member 28 faces the clamping magnet 27 in the axial direction with a prescribed gap therebetween. Thus, with the spindle motor M1 of this example, even if the clamping magnet 27 were to detach and float from the recess 23b of the disc guide 23, the clamping magnet 27 is stopped by abutting against the first bottom face 28c of the cylindrical member 28.

Furthermore, the second bottom face 28d of the cylindrical member 28 faces the upright portion 23a of the disc guide 23 in the axial direction with a prescribed gap therebetween. Thus, with the spindle motor M1 of this example, even if the disc guide 23 were to rise from the upper face 21b of the rotor case 21, the disc guide 23 is stopped by abutting against the second bottom face 28d of the cylindrical member 28.

Note that, in the present example, there are no particular restrictions on the material for the cylindrical member 28, but non-magnetic materials are preferred over magnetic materials, and non-magnetic metallic materials, such as brass, which has excellent durability and workability, are particularly preferable. The reason for this is that, because the outer diameter of the outer circumference 28a of the cylindrical member 28 is larger than the inner diameter of the clamping magnet 27, the cylindrical member 28 must be assembled with the rotary shaft 22 after the clamping magnet 27 is assembled, and if the cylindrical member 28 is made from a magnetic material, then an excessive attractive force is received from the clamping magnet 27 during assembly, thus making assembly difficult.

Furthermore, in the present invention, because a gap is provided between the first bottom face 28c of the cylindrical member 28 and the clamping magnet 27, even if the cylindrical member 28 is made from a metallic material, such as brass, there is no force applied to the clamping magnet 27 when press-fitting the cylindrical member 28, thus there is no risk of damaging the clamping magnet 27.

Figure 3:
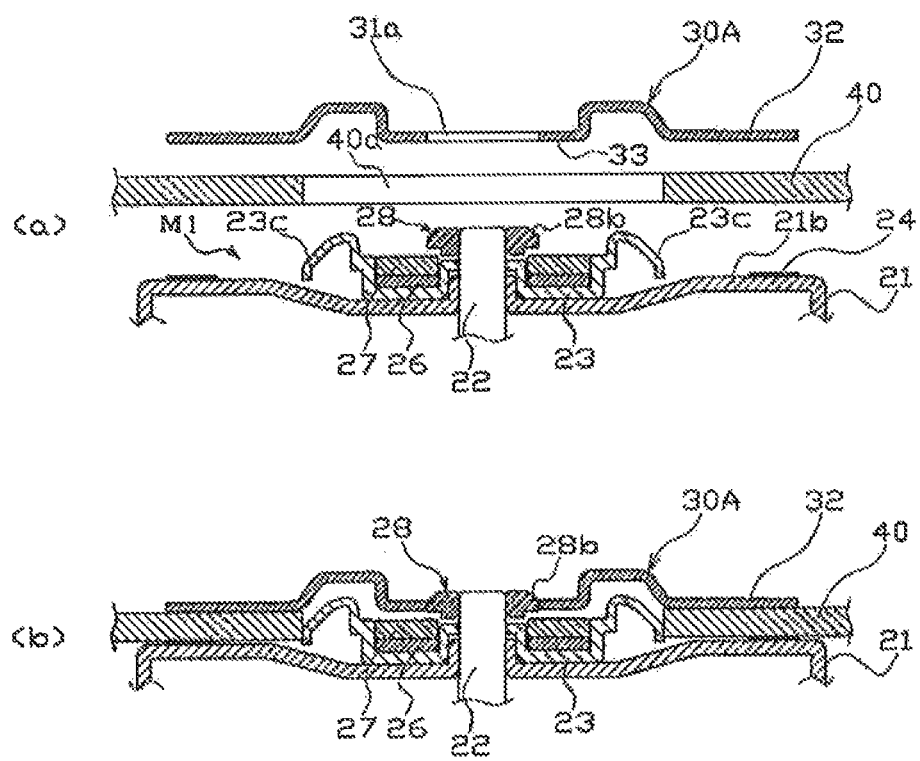
FIG. 3 is a sectional view showing the key elements of a disc clamping mechanism that uses the spindle motor M1 of FIG. 1; (a) shows the state before an optical disc is held, and (b) shows the state of the optical disc being held.

Next, a disc clamping mechanism that uses the spindle motor M1 of this example is described using FIG. 3. FIG. 3(a) shows the state before an optical disc is held, and FIG. 3(b) shows the state of the optical disc being held.

In FIG. 3, 30A is the clamper, and 40 is an optical disc. The spindle motor M1 and the clamper 30A are suitably supported in the case of a disc drive device, which is not shown. The clamper 30A is positioned toward the top of the spindle motor M1 and presents an overall disc shape, wherein at least the portion that faces the clamping magnet 27 (opposite face 33) is formed from a magnetic body. In the center of the clamper 30A, a positioning hole 31a is provided that has an inner diameter that is slightly larger than the outer circumference 28a of the cylindrical member 28. Furthermore, a disc pressing portion 32 is provided at the outer circumference of the clamper 30A.

When the optical disc 40 is transported to the space between the spindle motor M1 and the clamper 30A, as shown in FIG. 3(a), the spindle motor M1 is raised. Thereupon, as shown in FIG. 3(b), the plurality of guide claws 23c of the disc guide 23 are in direct contact with the inner edge of the central hole 40a of the optical disc 40, and the optical disc 40 is automatically centered. Meanwhile, the clamper 30A is automatically centered by way of being attracted by the clamping magnet 27 and the positioning hole 31a being guided along the inclined face 28b and the outer circumference 28a of the cylindrical member 28. Note that, because the upper part of the outer circumference 28a of the cylindrical member 28 of this example is the inclined face 28b, wherein the outer diameter gradually decreases in the upward direction, even if the centers of the clamper 30A and the rotary shaft 22 are slightly out of alignment, the clamper 30A will be suitably centered along the inclined face 28b. Consequently, the disc pressing portion 32 of the clamper 30A stably holds the optical disc 40 in the gap with the upper face 21b of the rotor case 21, and eccentricity when the optical disc 40 is rotated by way of driving the spindle motor M1 is controlled, thus allowing suitable recording and playback of the optical disc 40.

Thus, with the disc clamping mechanism of this example, the outer circumference 28a, which is fitted in the positioning hole 31a of the clamper 30A, and the cylindrical member 28, which has the first bottom face 28c that faces the clamping magnet 27 in the axial direction, are fixed in the upper portion of the rotary shaft 22. Consequently, even if a need to change the shape of the disc guide were to arise, the clamper can be positioned by the cylindrical member without changing the clamper. That is to say, clampers of the same shape can be used regardless of the shape of the disc guide on the turntable.

Figure 4:
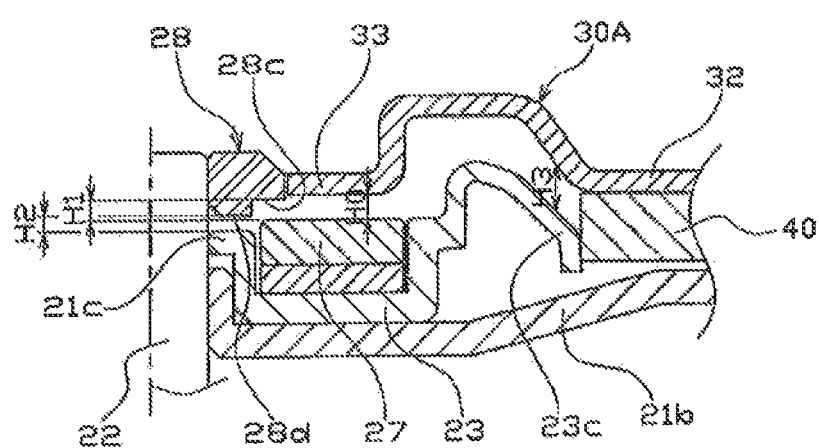
FIG. 4 is a sectional view of key elements for describing the positional relationship among the parts in the disc clamping mechanism of FIG. 3.

Next, the positional relationship among the parts in the disc clamping mechanism of this example is described in detail using FIG. 4. With the disc clamping mechanism of this example, the first bottom face 28c of the cylindrical member 28 faces the clamping magnet 27 in the axial direction with a gap H1 therebetween, and the second bottom face 28d of the cylindrical member 28 faces the upright portion 23a of the disc guide in the axial direction with a gap H2 therebetween. Furthermore, as in FIG. 4, in a state where the clamper 30A presses the optical disc 40 in contact with the turntable top, the first bottom face 28c of the cylindrical member 28 is positioned lower than the opposite face 33 of the clamper 30A that faces the clamping magnet 27 in the axial direction. That is to say, the gap H1 is established smaller than the gap H0. Consequently, with the disc clamping mechanism of this example, even if the clamping magnet 27 were to detach and rise from the turntable, the clamping magnet 27 is stopped by abutting against the first bottom face 28c of the cylindrical member 28, and does not touch the clamper 30A. Thus, even if the clamping magnet 27 were to detach from the turntable, the clamping magnet 27 will not attach to the clamper 30A, the optical disc 40 can be clamped in a state in which it is in pressing contact with the turntable top, and a stable disc drive can be achieved.

Furthermore, with the disc clamping mechanism of this example, the gap H1 is established larger than the gap H2. And, as in FIG. 4, in a state in which the clamper 30A presses the optical disc 40 in contact with the turntable top, with a gap H3 being the minimum gap in the axial direction between the disc guide 23 and the clamper 30A, then the gap H3 is established larger than the gap H2. Consequently, with the disk clamping device of this example, even if the disc guide 23, which houses the clamping magnet 27, were to rise from the turntable, the disc guide 23 is stopped by abutting against the second bottom face 28d of the cylindrical member 28, and the disc guide 23 will not push up the clamper 30A. Thus, even if the disc guide 23 were to rise from the turntable, the optical disc 40 can be clamped in a state in which it is in pressing contact with the turntable, and a stable disc drive can be achieved.

Figure 5:
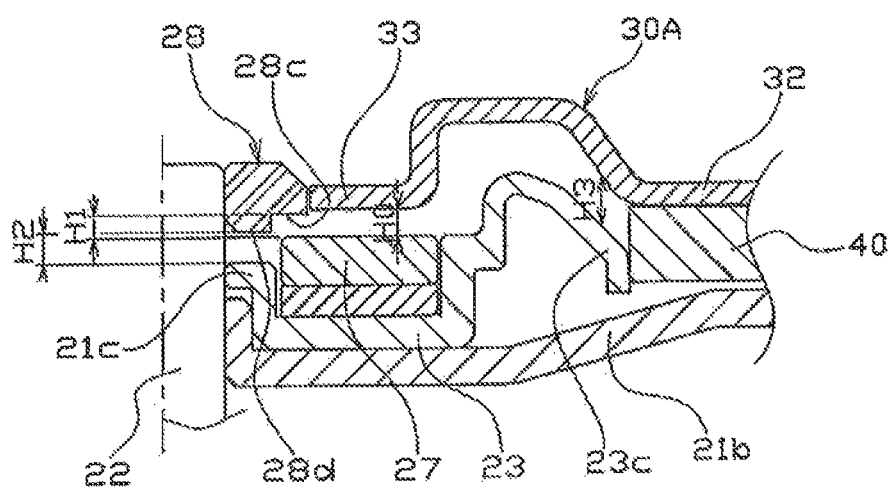
FIG. 5 is a sectional view of key elements for describing the positional relationship among the parts of a variant of the disc clamping mechanism of FIG. 3.
Figure 6:
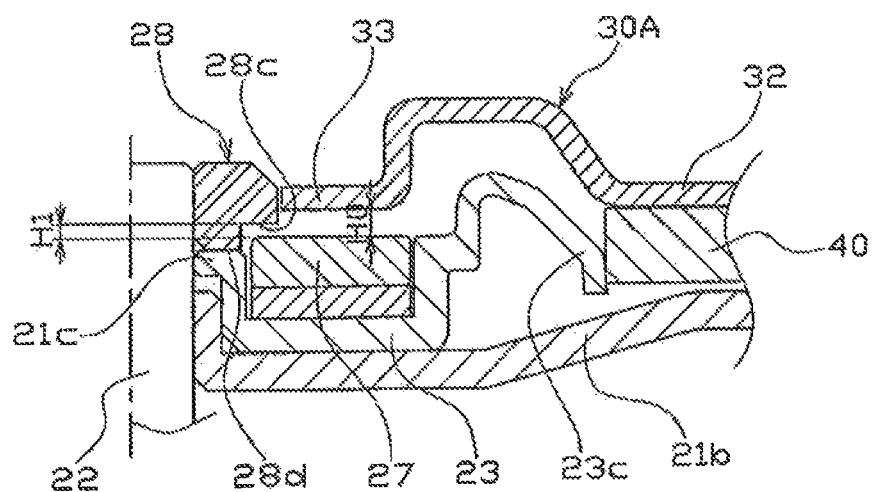
FIG. 6 is a sectional view of key elements for describing the positional relationship among the parts of another variant of the disc clamping mechanism of FIG. 3.

Note that although the gaps of the parts in the disc clamping mechanism of this example have the following relationship:

$0<H1<H0,$ $0<H2<H1,$ and $H2<H3;$ configurations such as the variants of FIG. 5 or 6, for example, are also possible.

With the variant of FIG. 5, the gaps for the parts of the disc clamping mechanism have the following relationship:

$0<H1<H0,$ $H1 \leq H2,$ and $H1<H3.$

Also in the disc clamping mechanism of FIG. 5, if the clamping magnet 27 rises from the turntable, the clamping magnet 27 is stopped by abutting against the first bottom face 28c of the cylindrical member 28, and does not touch the clamper 30A. Furthermore, even if the disc guide 23 were to rise from the turntable, the clamping magnet 27 would be stopped by abutting against the first bottom face 28c of the cylindrical member 28, so that the disc guide 23 would not touch the clamper 30A. Thus, even if the clamping magnet 27 or disc guide 23 were to rise from the turntable, the optical disc 40 would be able to be clamped in a state in which it is in pressing contact with the turntable, and stable disc drive would be possible.

In the variant of FIG. 6, the gaps for the parts of the disc clamping mechanism have the following relationship:

$0<H1<H0,$ and $H2=0.$

Also in the disc clamping mechanism of FIG. 6, if the clamping magnet 27 rises from the turntable, the clamping magnet 27 is stopped by abutting against the first bottom face 28c of the cylindrical member 28, and does not touch the clamper 30A. Furthermore, because the disc guide 23 abuts against the second bottom face 28d of the cylindrical member 28, the disc guide 23 will not rise from the turntable, and the disc guide 23 will not push up the clamper 30A. Thus, the optical disc 40 can be clamped by the clamper 30A in a state in which it is in pressing contact with the turntable top, and stable disc drive can be achieved.

Second Embodiment

Figure 7:
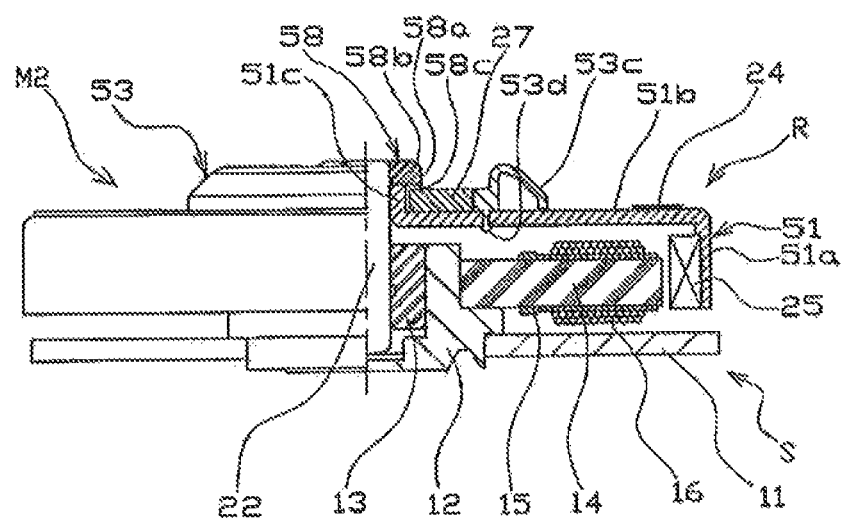
FIG. 7 is a side view of a spindle motor M2 according to a second embodiment of the present invention, and the right half of the drawing is shown as a cross-section.

Next, the configuration of a spindle motor according to a second embodiment of the present invention is described by way of FIG. 7. FIG. 7 is a side view of a spindle motor M2 of this example, and the right half of the drawing is shown as a cross-section. In FIG. 7, parts that are the same as parts in FIG. 1 are given identical reference numerals, and description of these parts is omitted.

The spindle motor M2 of this example differs from the spindle motor M1 of FIG. 1 primarily in the shapes of the rotor case, disc guide, and cylindrical member.

The rotor case 51 of this example is formed into a cap shape from a magnetic plate, and has a cylinder part 51a, which is formed into a cylinder with the same axis as the rotary shaft 22, and a upper face 51b. which is a plane. The rotary shaft 22 is fixed to a burring 51c, which is provided in the center of the upper face 51b of the rotor case 51.

The disc guide 53 of this example is formed in an annular shape from a hard resin; a plurality of guide claws 53c are provided at the outer circumference thereof at equal intervals in the rotational direction, and a plurality of protrusions 53d are provided on the bottom face. Furthermore, the inner diameter of the disc guide 53 serves as a through-opening. The disc guide 53 is unified with the rotor case 51 by way of inserting and thermal compression bonding the protrusions 53d in the plurality of through-holes provided in the upper face 51b of the rotor case 51.

The clamping magnet 27 is disposed in the through-opening portion of the disc guide 53 and is directly disposed on the upper face 51b of the rotor case 51. Thus, the rotor case 51 serves as a back yoke for the clamping magnet 27, and with the spindle motor M2 of this example, the yoke plate 26 in FIG. 1 is unnecessary.

Figure 8:
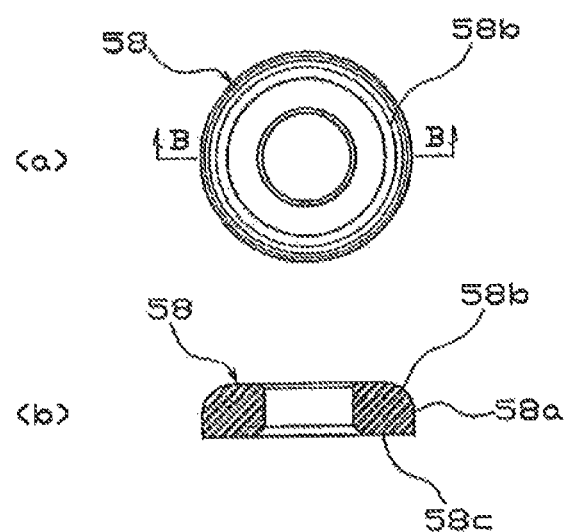
FIG. 8 shows a cylindrical member in the spindle motor M2 of FIG. 7; (a) is a top view, and (b) is a sectional view cut along the line B-B in (a).

As shown in FIG. 8, the upper part of the outer circumference 58a of the cylindrical member 58 of this example, which is parallel with the axial direction, is the inclined face 58b, which is curved, the outer diameter thereof gradually decreasing in the upward direction. Furthermore, the bottom face of the cylindrical member 58 is the flat first bottom face 58c.

As shown in FIG. 7, the structure is such that the outer diameter of the outer circumference 58a of the cylindrical member 58 is larger than the inner diameter of the clamping magnet 27, and the first bottom face 58c of the cylindrical member 58 faces the top face of the clamping magnet 27 in the axial direction. Thus, with the spindle motor M2 of this example, the same as with the spindle motor M1, even if the clamping magnet 27 were to detach and rise from the turntable, the clamping magnet 27 would be stopped by abutting against the first bottom face 58c of the cylindrical member 58.

Figure 9:
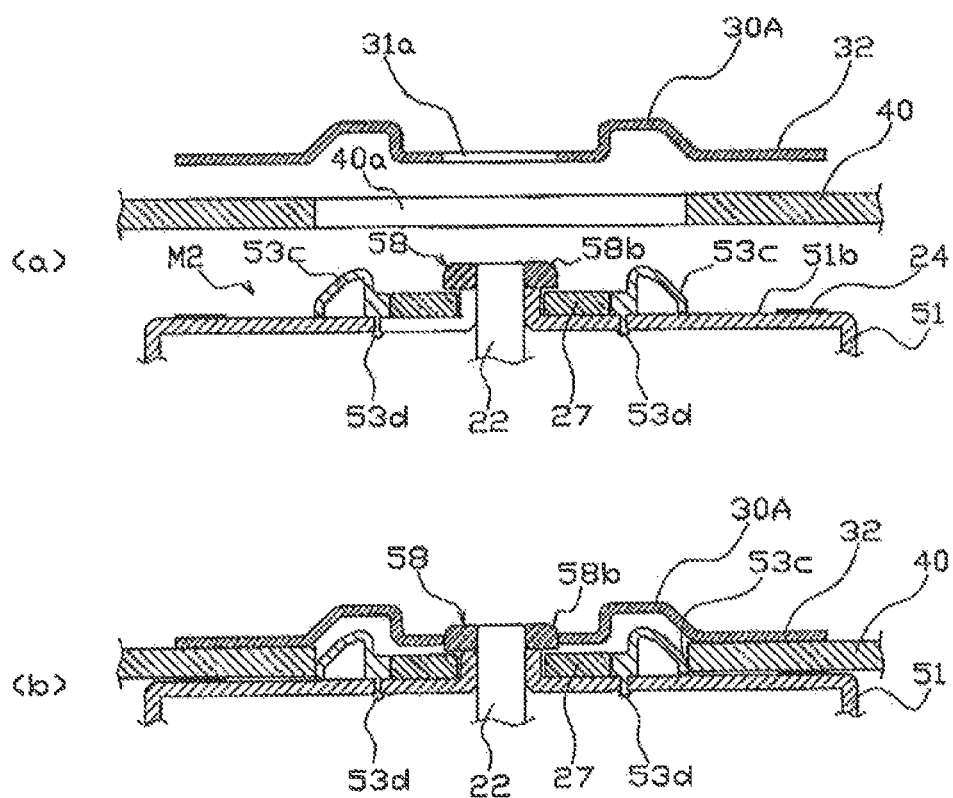
FIG. 9 is a sectional view showing the key elements of a disc clamping mechanism that uses the spindle motor M2 of FIG. 7; (a) shows the state before an optical disc is held, and (b) shows the state of the optical disc being held.

Next, a disc clamping mechanism that uses the spindle motor M2 of this example is described using FIG. 9. FIG. 9(a) shows the state before an optical disc is held, and FIG. 9(b) shows the state of the optical disc being held.

In FIG. 9, parts that are the same as parts in FIG. 3 are given identical reference numerals, and description of these parts is omitted. When the optical disc 40 is transported to the space between the spindle motor M2 and the clamper 30A as shown in FIG. 9(a), the spindle motor M2 is raised. Thereupon, as shown in FIG. 9(b), the guide claws 53c of the disc guide 53 abut the inner edge of the central hole 40a of the optical disc 40, and the optical disc is automatically centered. Meanwhile, the clamper 30A is automatically centered by way of being attracted by the clamping magnet 27 and the positioning hole 31a being guided along the inclined face 58b and the outer circumference 58a of the cylindrical member 58. Consequently, the disc pressing portion 32 of the clamper 30A stably holds the optical disc 40 in the gap with the upper face 51b of the rotor case 51, and eccentricity when the optical disc 40 is rotated by way of driving the spindle motor M2 is controlled, thus allowing suitable recording and playback of the optical disc 40.

Thus, with the disc clamping mechanism of this example, the outer circumference 58a, which is fitted in the positioning hole 31a of the clamper 30A, and the cylindrical member 58, which has the first bottom face 58c that faces the clamping magnet 27 in the axial direction, are fixed in the upper portion of the rotary shaft 22. Consequently, even if a need to change the shape of the disc guide were to arise, the clamper would be able to be positioned by the cylindrical member without changing the clamper. That is to say, clampers of the same shape can be used without relying on the shape of the disc guide on the turntable.

Figure 10:
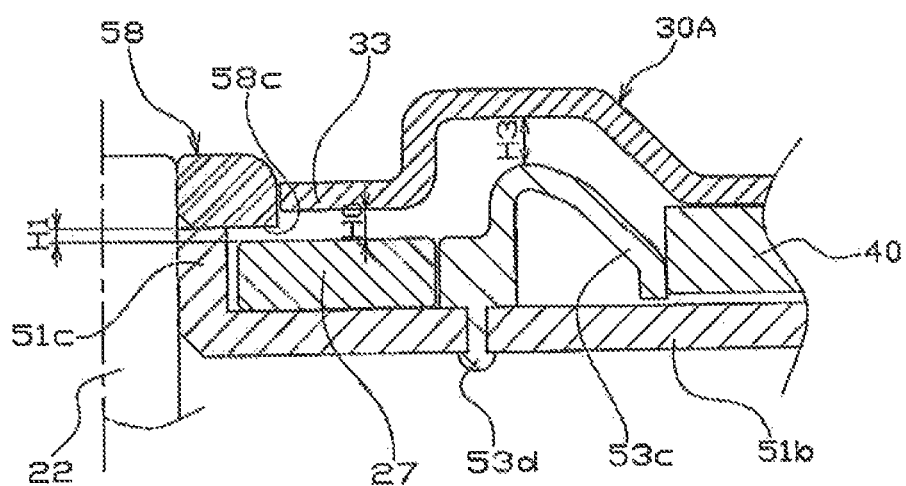
FIG. 10 is a sectional view of key elements for describing the positional relationship among the parts in the disc clamping mechanism of FIG. 9.

Next, the positional relationship among the parts in the disc clamping mechanism of this example is described in detail using FIG. 10. With the disc clamping mechanism of this example, the first bottom face 58c of the cylindrical member 58 faces the clamping magnet 27 in the axial direction with a gap H1 therebetween. Furthermore, as in FIG. 10, in a state where the clamper 30A presses the optical disc 40 in contact with the turntable top, the first bottom face 58c of the cylindrical member 58 is positioned lower than the opposite face 33 of the clamper 30A that faces the clamping magnet 27 in the axial direction. That is to say, the gap H1 is established smaller than the gap H0. Consequently, according to the disc clamping mechanism of this example, even if the clamping magnet 27 were to detach and rise from the turntable, the clamping magnet 27 would be stopped by abutting against the first bottom face 58c of the cylindrical member 58, and would not touch the clamper 30A. Thus, even if the clamping magnet 27 were to detach from the turntable, the clamping magnet 27 would not attach to the clamper 30A, the optical disc 40 would be able to be clamped in a state in which it is in pressing contact with the turntable, and a stable disc drive can be achieved.

Furthermore, with this example, the clamping magnet 27 is disposed so as to be in direct contact with the upper face 51b of the rotor case 51, the magnetic body rotor case 51 serves as the back yoke, and the yoke plate 26 in FIG. 1 is unnecessary. Accordingly, the overall spindle motor can be made to have a lower profile.

The embodiments of the present invention were described above, but the present invention is not limited to these modes of embodiment, and the present invention can be practiced with suitable changes to the various component members or the like, within the scope of the gist of the invention.

For example, in the above embodiments, the cylindrical member 28, 58 has a through-hole, but it may also be a cap shape with a closed top face. Furthermore, in the above embodiments, an inclined face 28b, 58b is provided in the upper portion of the outer circumference 28a, 58a of the cylindrical member 28, 58, but the inclined face 28b, 58b does not necessarily have to be provided if, for example, an inclined face, which has the same functionality, is provided in the positioning portion on the clamper side, or if a disc guide is used for clamper positioning uses. Furthermore, in the above modes of embodiment, the cylindrical member 28, 58 is directly press-fit into the rotary shaft 22, but it can also be press-fitted in the outer circumference of the barring part 21c, 51c of the rotor case or in the outer circumference of the upright portion 23a of the disc guide.

Figure 11:
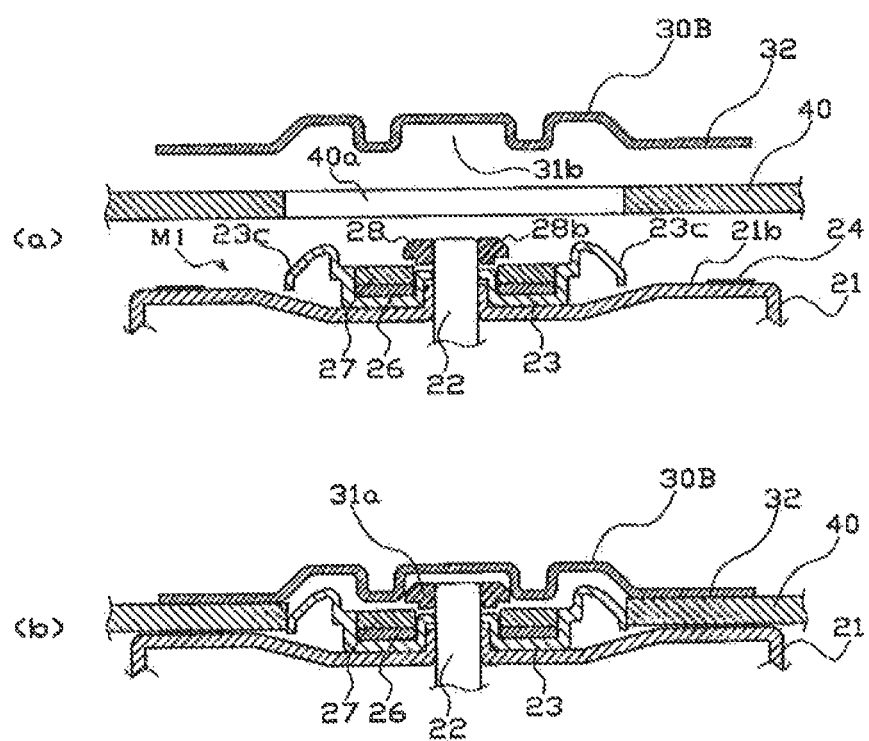
FIG. 11 is a sectional view showing the key elements of another disc clamping mechanism of the present invention; (a) shows the state before an optical disc is held, and (b) shows the state of the optical disc being held.

Furthermore, in the above embodiments, the clamper 30A that has a positioning hole 31a is used, but as shown in FIG. 11, a clamper 30B that has a positioning recess 31b can also be used, for example. The inner diameter of the positioning recess 31b is slightly larger than the outer diameter of the outer circumference 28a of the cylindrical member 28. However, as in FIG. 11, with a structure that performs clamper centering by way of fitting the positioning recess 31b of the clamper 30B with the outer circumference 28a of the cylindrical member 28, slight variations in centering precision tend to occur. The reason for this is that, because there are many cases in which a clamper requires raised/recessed machining in addition to the positioning recess 31b for centering, precise control of the inner diameter dimension of the positioning recess 31b for centering is difficult, and variations in the inner diameter tends to occur. Meanwhile, variations in centering precision can be controlled with a structure wherein the clamper is centered by way of fitting the clamper positioning hole 31a and the outer circumference 28a, 58a of the cylindrical member 28, 58a in the modes of embodiment above. The reason for this is that the dimensions of the positioning hole 31a can be easily managed regardless of the raising/recessing on the clamper. Thus, for the disc clamping mechanism of the prevent invention, the embodiments of FIG. 3 or FIG. 9 are preferred over the embodiment of FIG. 11.

Figure 12:
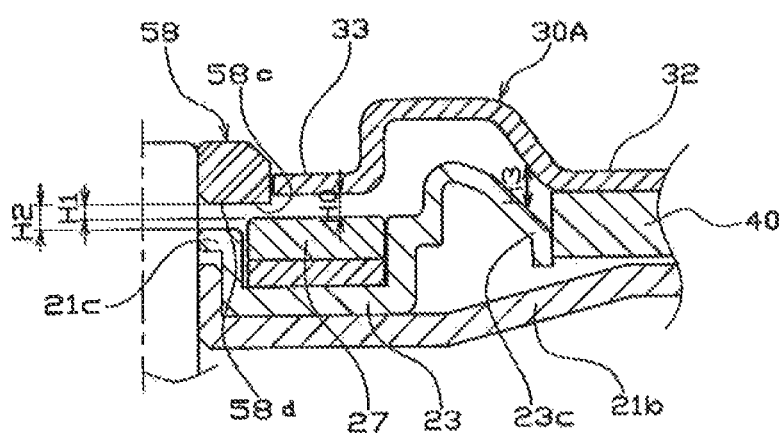
FIG. 12 is a sectional view of key elements for describing the positional relationship among the parts in another disc clamping mechanism of the present invention.
Figure 13:
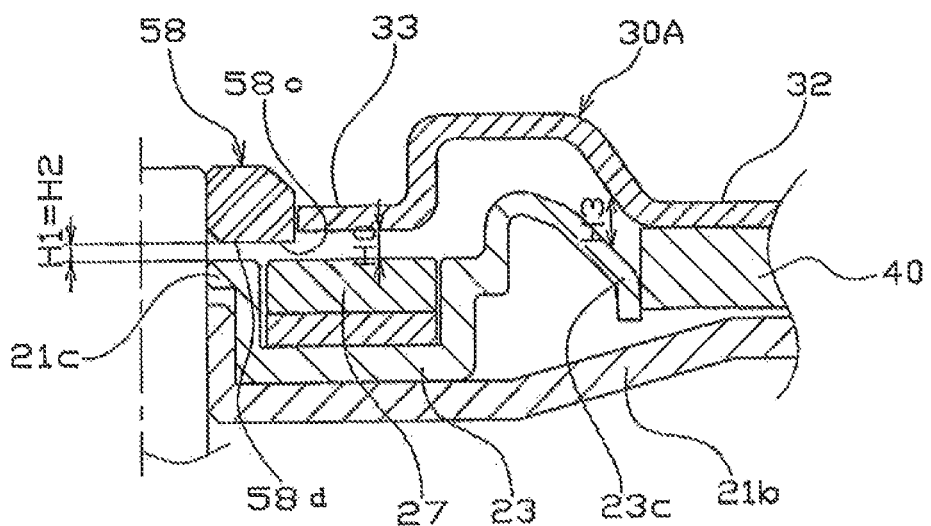
FIG. 13 is a sectional view of key elements for describing the positional relationship among the parts in another disc clamping mechanism of the present invention.
Figure 14:
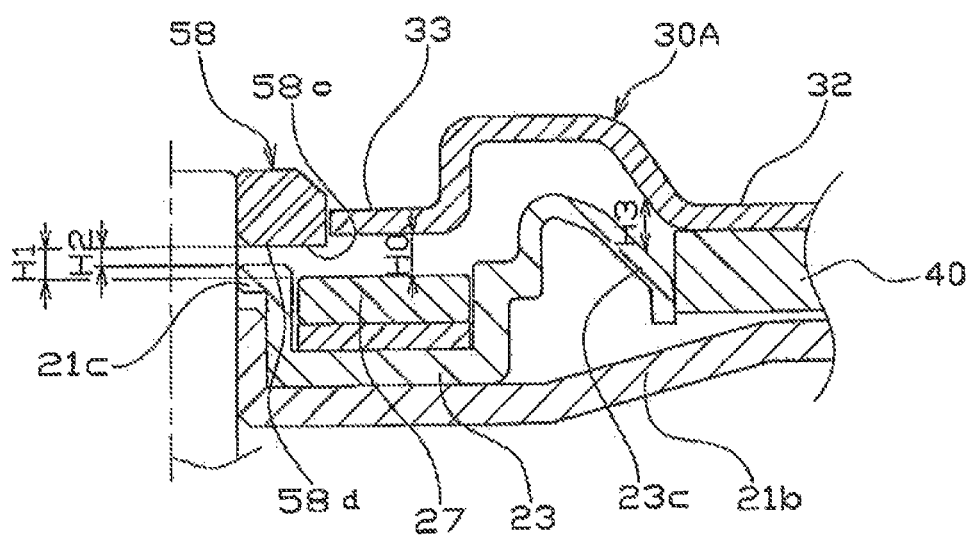
FIG. 14 is a sectional view of key elements for describing the positional relationship among the parts in another disc clamping mechanism of the present invention.
Figure 15:
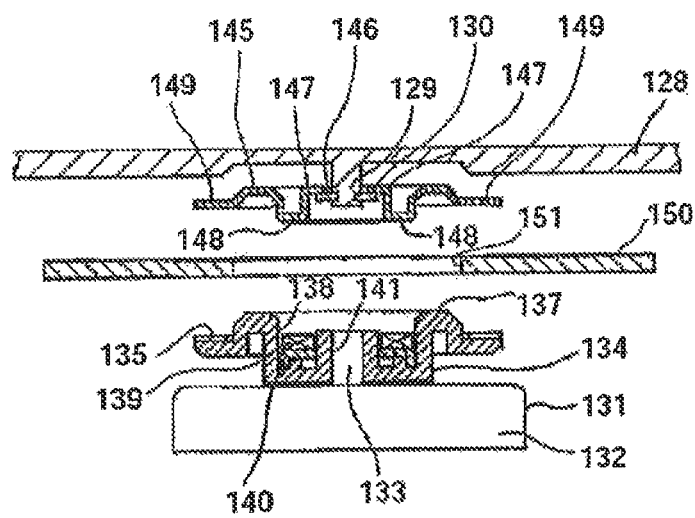
FIG. 15 is a longitudinal sectional view that shows a conventional example of a disc rotary drive portion of a disc drive device; the state before an optical disc is held is shown.
Figure 16:
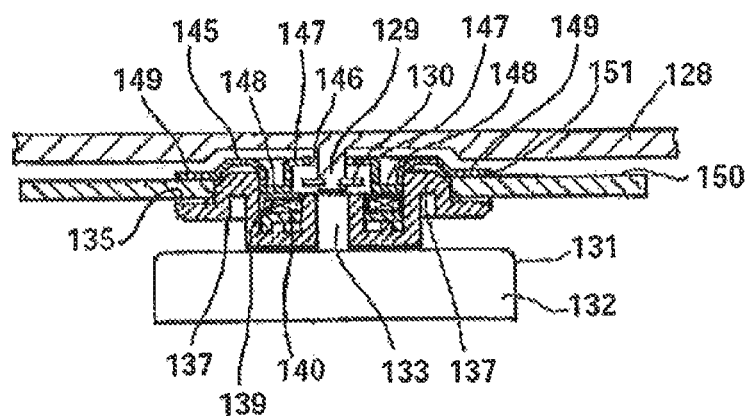
FIG. 16 is a longitudinal sectional view that shows a conventional example of a disc rotary drive portion of a disc drive device; the state of an optical disc being held is shown.

Furthermore, the disc guide 23 used in the first embodiment and the cylindrical member 58 used in the second embodiment can be combined for a configuration such as in FIG. 12 to FIG. 14. In the example in FIG. 12, the gaps for the parts of the disc clamping mechanism have the following relationship:

$$0 < H1 < H0.$$

$$H1 < H2, \text{ and}$$

$$H1 < H3.$$

In the example in FIG. 13, the gaps for the parts of the disc clamping mechanism have the following relationship:

$$0 < H1 < H0, \text{ and}$$

$$H1 = H2 < H3.$$

In the example in FIG. 14, the gaps for the parts of the disc clamping mechanism have the following relationship:

$$0 < H1 < H0,$$

$$0 < H2 < H1, \text{ and}$$

$$H2 < H3.$$

In the disc clamping mechanism of FIG. 12 to FIG. 14 as well, even if the clamping magnet 27 or the disc guide 23 were to rise from the turntable, the optical disc 40 would be clamped in a state in which it is pressed in contact with the turntable top, and stable disc driving would be possible.

This invention can be applied to a disc clamping mechanism whereby an optic disk, a magneto-optical disc or the like is held and rotated.

DESCRIPTION OF REFERENCE NUMERALS 11 base
12 bearing holder
13 bearing
14 stator core
15 core cover
16 coil
21 rotor case
21a cylinder part
21b upper face
21c burring
22 rotary shaft
23 disc guide
23a upright portion
23b recess
23c guide claws
24 friction sheet
25 driving magnet
26 yoke plate
27 clamping magnet
28 cylindrical member
28a outer circumference
28b inclined face
28c first bottom face
28d second bottom face
30A, 30B clamper
31a positioning hole
31b positioning recess
32 disc pressing portion
33 opposite face
40 optical disc
40a central hole
51 rotor case
51a cylinder part
51b upper face
51c burring
53 disc guide
53c guide claws
53d protrusion
58 cylindrical member
58a outer circumference
58b inclined face
58c first bottom face
M1, M2 spindle motor
R rotor
S stator

What is claimed is:

1. A disc clamping mechanism comprising with a spindle motor having a turntable on which a disc is placed and which rotates united with a rotary shaft, a clamper which is positioned on an upper portion of said spindle motor, a disc guide that guides an inner edge of said disc;
   a clamping magnet which is disposed in an inner diameter of said disc guide,
   a cylindrical member which is fixed to an upper portion of said rotary shaft,
   wherein said cylindrical member has a first bottom face that faces said clamping magnet in the axial direction with a first gap therebetween, and
   said first bottom face, in a state in which said clamper presses a disc in contact with the top of said turntable, is positioned below a facing part of said clamper which faces said clamping magnet in the axial direction.

2. The disc clamping mechanism according to claim 1, wherein, said disc guide has an annular recess, and said clamping magnet is disposed in said recess, said cylindrical member has a second bottom face in the inner diameter of said first bottom face, and said second bottom face faces said disc guide in the axial direction with a gap therebetween.

3. The disc clamping mechanism according to claim 2, wherein said first gap is larger than said second gap and in a state in which said clamper presses a disc in contact with said turntable top, with a third gap being the minimum gap in the axial direction between said disc guide and said clamper, said third gap is larger than said second gap.

4. The disc clamping mechanism according to claim 2, wherein said first gap is no greater than said second gap and in a state in which said clamper presses a disc in contact with said turntable top, with a third gap being the minimum gap in the axial direction between said disc guide and said clamper, said third gap is larger than said first gap.

5. The disc clamping mechanism according to claim 1, wherein said disc guide has an annular recess, and said clamping magnet is disposed in said recess, said cylindrical member has a second bottom face in the inner diameter of said first bottom face, and said second bottom face is in direct contact with said disc guide.

6. The disc clamping mechanism according to claim 1, wherein said disc guide has a through-opening, said clamping magnet is disposed in said through-opening and abuts against said turntable.

7. The disc clamping mechanism according to claim 1, wherein said clamper has a positioning hole or a positioning recess, and said cylindrical member has an outer circumference that is fitted in the positioning hole or positioning recess of said clamper.

8. The disc clamping mechanism according to claim 7, wherein said cylindrical member has an inclined face on an upper portion of said outer circumference, and the outer diameter gradually decreases in the upward direction.

9. The disc clamping mechanism according to claim 1, wherein said cylindrical member is made from a non-magnetic material.

* * * * *